(12) United States Patent
Alon et al.

(10) Patent No.: US 7,711,063 B2
(45) Date of Patent: May 4, 2010

(54) DIGITAL TRANSMITTER WITH DATA STREAM TRANSFORMATION CIRCUITRY

(75) Inventors: Elad Alon, Saratoga, CA (US);
Vladimir Stojanovic, Lexington, MA (US); Amir Amirkhany, Stanford, CA (US)

(73) Assignees: Rambus, Inc., Los Altos, CA (US); The Board of Trustees of the Leland Stanford Junior University, Palo Alto, CA (US)

( * ) Notice: Subject to any disclaimer, the term of this patent is extended or adjusted under 35 U.S.C. 154(b) by 833 days.

(21) Appl. No.: 11/213,353

(22) Filed: Aug. 25, 2005

(65) Prior Publication Data

US 2006/0280259 A1 Dec. 14, 2006

Related U.S. Application Data

(60) Provisional application No. 60/689,729, filed on Jun. 10, 2005.

(51) Int. Cl.
*H04L 27/00* (2006.01)
(52) U.S. Cl. .................................... 375/295; 375/326
(58) Field of Classification Search ................. 375/295, 375/326
See application file for complete search history.

(56) References Cited

U.S. PATENT DOCUMENTS 6,950,475 B1 * 9/2005 Lewis .......................... 375/260

2003/0138061 A1 * 7/2003 Li ................................ 375/326

FOREIGN PATENT DOCUMENTS

WO   WO 2004105303   * 12/2004   ................. 375/326

OTHER PUBLICATIONS

International Search Report for International Application No. PCT/US2006/022652, mailed Nov. 2, 2006.
Cronquist, D.C., et al., "Architecture Design of Reconfigurable Pipelined Datapaths," Proceedings of 20th Conf. on Advanced Research in VLSI, Atlanta, Georgia, Mar. 21-24, 1999, pp. 23-20.
Mangione-Smith, W.H., et al., "Seeking Solutions in Configurable Computing," Computer, vol. 30, No. 12, Dec. 1997, pp. 38-40.

* cited by examiner

*Primary Examiner*—David C Payne
*Assistant Examiner*—Tanmay K Shah
(74) *Attorney, Agent, or Firm*—Morgan, Lewis & Bockius LLP

(57) ABSTRACT

A transmitter with data stream transformation circuitry is described. The transmitter has a first driver and a second driver. Each driver has an output for a respective analog signal. A summation circuit combines respective analog signals from the first driver and the second driver. A data selection circuit processes at least two data streams. Each data stream corresponds to a time sequence of digital data symbols. The data selection circuit selectively couples at least one of the data streams to at least one of the drivers during each time interval of a sequence of time intervals, thereby applying a linear transformation to the data streams. A finite state machine controls the data selection circuit during each time interval of the sequence of time intervals.

26 Claims, 11 Drawing Sheets

US 7,711,063 B2

DIGITAL TRANSMITTER WITH DATA STREAM TRANSFORMATION CIRCUITRY

CROSS-REFERENCE TO RELATED APPLICATIONS

This application claims the benefit of Provisional Patent Application No. 60/689,729, filed Jun. 10, 2005, which is incorporated by reference herein in its entirety.

FIELD OF THE INVENTION

The present invention relates generally to communications systems, and in particular to communications systems having a digital transmitter with data stream transformation circuitry.

BACKGROUND

Communications systems, such as multi-tone links, often perform signal processing operations on data based on a communications technique being used and/or one or more characteristics of a communications channel. For example, communication systems may code and/or frequency band limit the data using a transformation, such as a discrete Fourier transform (DFT) or an inverse discrete Fourier transform (IDFT). Filters, such a finite impulse response (FIR) filter or a polyphase filter, may equalize and/or shape a spectral content of the data in at least a band of frequencies corresponding to at least one communications channel. And depending on the characteristics of the communications channel, the filters and/or a modulation code used to modulate the data may also be adapted.

In some communications systems it is advantageous to implement many of these signal processing operations in a transmitter. However, supporting a wide variety of operations in the transmitter, especially in those systems that include adaptive signal processing and/or adaptive modulation coding, may increase complexity and/or expense. There is a need, therefore, for an improved digital transmitter in communication systems.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1A:
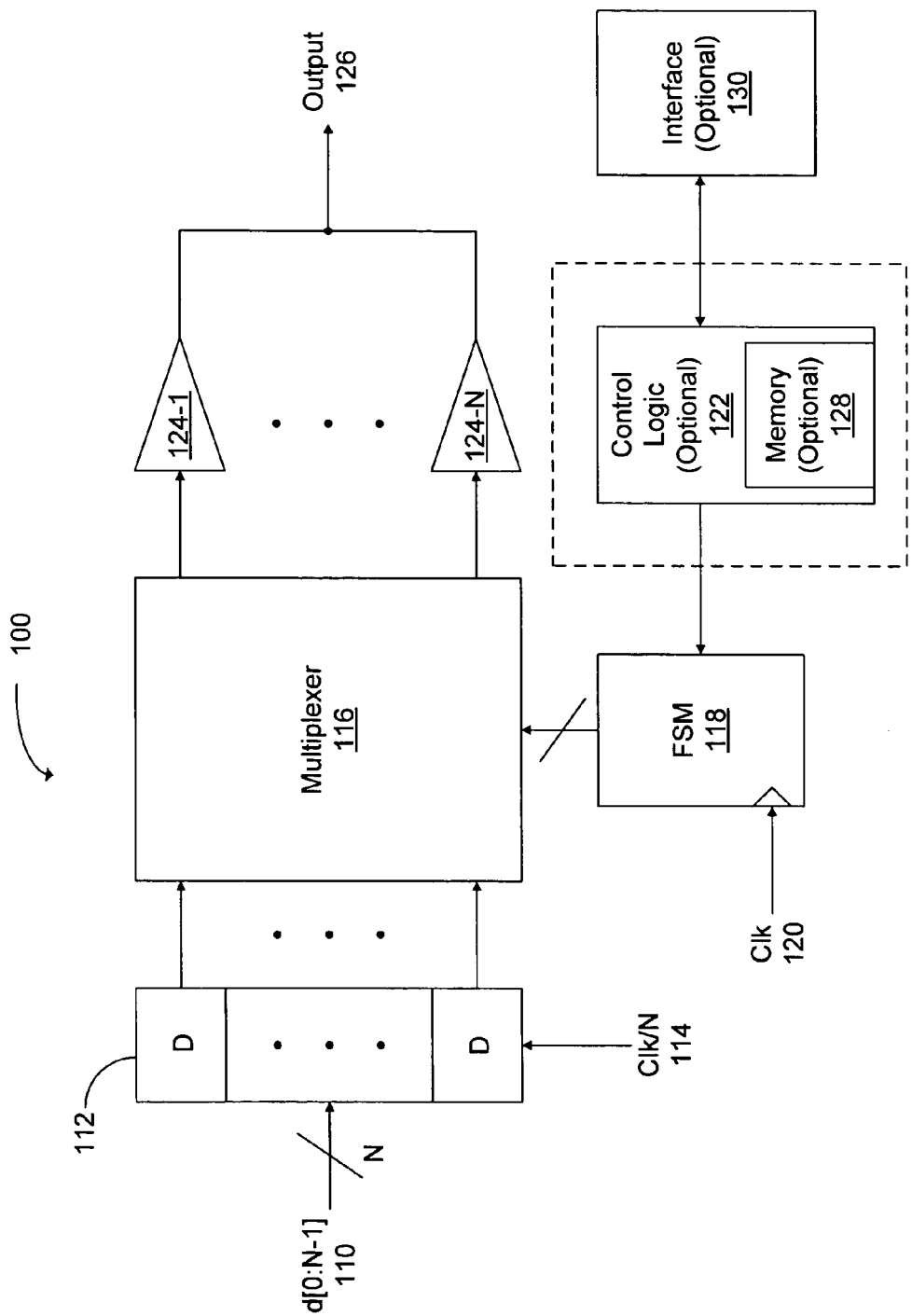
FIG. 1A is a block diagram illustrating an embodiment of a digital transmitter.

A digital transmitter with data stream transformation circuitry is described. The transmitter has at least a first driver and a second driver. Each driver has an output for a respective analog signal. A summation circuit combines respective analog signals from the first driver and the second driver. A data selection circuit processes at least two data streams. Each data stream corresponds to a time sequence of digital data symbols. The data selection circuit selectively couples at least one of the data streams to at least one of the drivers during each time interval of a sequence of time intervals, thereby applying a linear transformation to the data streams. A finite state machine controls the data selection circuit during each time interval of the sequence of time intervals.

In some embodiments, the finite state machine controls the data selection circuit during each time interval of the sequence of time intervals in accordance with a programmable code word. In some embodiments, the finite state machine controls the data selection circuit during each time interval of the sequence of time intervals in accordance with a respective code word in a set of code words.

The selective coupling may be varied during a plurality of the time intervals in accordance with a sequence of code words in the set of code words. In some embodiments, at least the two data streams are selectively coupled to the first driver and the second driver during each time interval.

The respective code word may be selected in accordance with at least a characteristic of a communications channel coupled to the transmitter. The respective code word may also be selected in accordance with at least one receiver device coupled to the transmitter.

The transmitter may include a memory and/or a control logic. The memory may store the set of code words. The control logic may provide the respective code word to the finite state machine. The respective code word may be programmable. In some embodiments, the transmitter includes an interface coupled to the finite state machine. The interface is configured to receive the respective code word.

A sum of respective gains of the first driver and the second driver may substantially corresponds to a maximum output signal power from the summation circuit.

At least one of at least the two data stream may include, during each of the sequence of time intervals, a current digital data symbol and at least one prior digital data symbol. The transmitter may include a digital delay circuit for delaying one or both of at least the two data streams. The digital delay circuit may include at least a first digital delay. At least the one prior digital data symbol is provided by an output from the digital delay circuit. The linear transformation may include combining the current digital data symbol and at least the one prior digital data symbol of at least the one data stream. The combining of the current digital data symbol and at least the one prior digital data symbol of at least the one data stream accomplishes equalization.

The transmitter may also include a phase rotation circuit for processing at least the two data streams. The phase rotation circuit modifies a respective phase of at least the two data streams and the linear transformation includes an inverse discrete Fourier transform.

In some embodiments, at least the two data streams correspond to respective sub-channels in a multi-tone system.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

FIG. 1A illustrates an embodiment of a digital transmitter 100. Two or more data streams 110, each corresponding to a time sequence of digital data symbols, are coupled to a digital delay circuit 112. The digital delay circuit 112 is clocked using Clk/N 114, where N corresponds to a number of data streams 110. In exemplary embodiments, N is 2, 4 or 8. An output from the digital delay circuit 112, including a current digital data symbol in each of the data streams 110 and at least one prior digital data symbol of at least one of the data streams 110, is coupled to a multiplexer 116, which is a data selection circuit. The multiplexer 116 selectively couples the current digital data symbol and at least the one prior digital data symbol of at least one of the data streams 110 to at least one of two or more drivers 124 during each time interval of a sequence of time intervals in accordance with a finite state machine (FSM) 118. The FSM 118 is clocked using Clk 120, which at least corresponds to Nyquist's criterion. The drivers 124 each have an output for a respective analog signal. Respective analog signals from the drivers 124 are combined into output 126.

In some embodiments of the digital transmitter 100, the FSM 118 controls the multiplexer 116 during each time interval of a sequence of time intervals in accordance with a programmable code word. In some embodiments, the FSM 118 controls the multiplexer 116 during each time interval of the sequence of time intervals in accordance with a respective code word in a set of code words. The set of code words may be fixed.

The selective coupling may be varied during a plurality of the time intervals in accordance with a sequence of code words in the set of code words. In some embodiments, at least two of the data streams 110 are selectively coupled to two of the drivers 124 during each time interval. In some embodiments, each of the data streams 110 is routed to at least one of the drivers 124 during each time interval.

The transmitter 100 applies a linear transformation to the data streams 110. By combining and selectively weighting, using at least one of the drivers 124, the current digital data symbol and at least the one prior digital data symbol of at least one of the data stream 110 the linear transformation accomplished equalization. Embodiments, such as transmitter 400 shown in FIG. 4, may implement an arbitrary equalization depth or data history of M by including M taps 412 corresponding to digital delay circuits 410. Referring back to FIG. 1A, the linear transformation, which is a weighted sum of the data streams 110, may also implement generalized orthogonal coding or frequency-to-time (i.e., frequency domain to time domain) transformations, such as a Hadamard transformation (i.e., by applying rows of a Hadamard matrix during a transformation)), a discrete cosine transformation (DCT), a discrete Fourier transform (DFT), an inverse discrete Fourier transform (IDFT), a fast Fourier transform (FFT) or an inverse fast Fourier transform (IFFT).

Figure 1B:
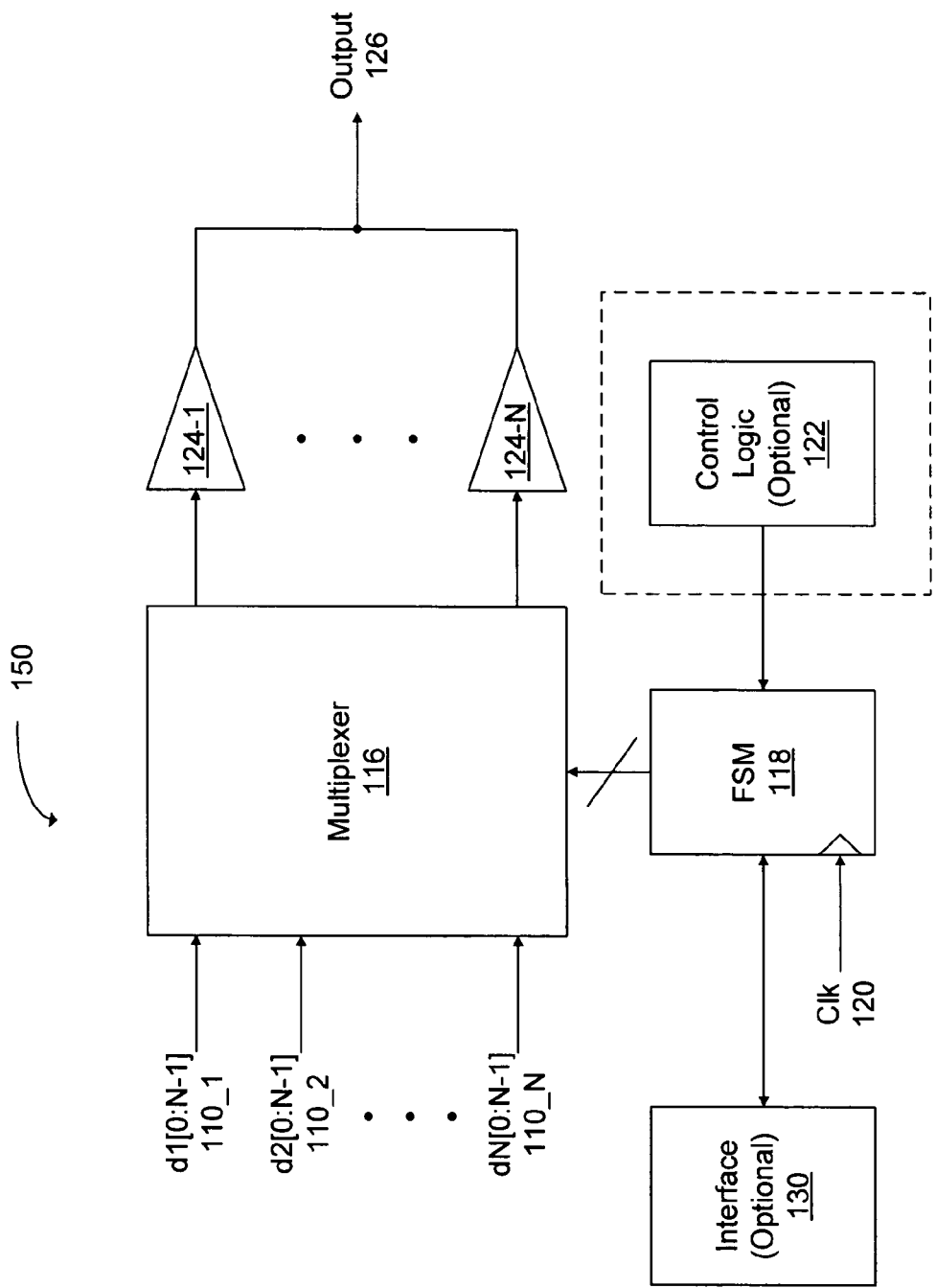
FIG. 1B is a block diagram illustrating an embodiment of a digital transmitter.

The transmitter 100 may be configured, adapted and/or programmed to implement one or more linear transformations in conjunction with or without equalization. This is illustrated in an embodiment of a transmitter 150 shown in FIG. 1B, where the digital delay circuit 112 (FIG. 1A) has been removed and the data streams 110 are coupled to the multiplexer 116. Therefore, during each time interval at least the current digital data symbol in at least one of the data streams 110 is coupled to at least one of the drivers 124. Referring back to FIG. 1A, in alternate embodiments the transmitter 100 may only implement equalization.

The linear transformation may be varied during each time interval and/or during the sequence of time intervals. The linear transformation may be adapted. The adaptation may be dynamic. For example, the respective code word, corresponding to a respective linear transformation, may be selected in accordance with at least a characteristic, such as a notch in a band of frequencies, of a communications channel coupled to the transmitter 100. The respective code word may also be selected in accordance with at least one receiver device coupled to the transmitter 100.

During each time interval, the linear transformation may be described most generally by $$V_{Out}[k] = w[k](t) \cdot \text{data}[k],$$

where $V_{out}(t)$ represents the output 126, data[k] represents one or more digital data symbols in one or more data streams 110 and may include at least the one prior digital data symbol of at least one of the data streams 110, and $w[k](t)$ represents a weight. $w[k](t)$ is selected by choosing a number of drivers 124 that digital data symbols in one or more of the data streams 110 are selectively coupled to during each time interval. The weighted drivers 124, therefore, comprise a digital-to-analog converter and the transmitter 100 is a configurable, adaptable and/or programmable analog processing element.

The transmitter 100 may implement any linear transformation that can be expressed as a weighted sum of a set of digital data symbols in one or more of the data streams 110. The transmitter can perform such linear transformations without a penalty associated with excess parasitic capacitance loading, since only those drivers 124 that are need may be coupled to the output 126 during each time interval.

The transmitter 100 may include an optional control logic 122. The control logic 122 may provide one or more code words to the FSM 118. The control logic 122 may provide the respective code word during each time interval of the sequence of time intervals to the FSM 118. In some embodiments, the respective code word may be programmable.

The transmitter 100 may include an optional memory 128. The memory 128 may store one or more code words including the set of code words.

The transmitter 100 may include an optional interface 130. The interface is coupled to the control logic 122 and is configured to receive the respective code word. In some embodiments (such as the transmitter 150 in FIG. 1B), the interface 130 may be coupled to the FSM 118. The interface 130 may be capable of uni-directional or bi-directional communication.

Figure 2:
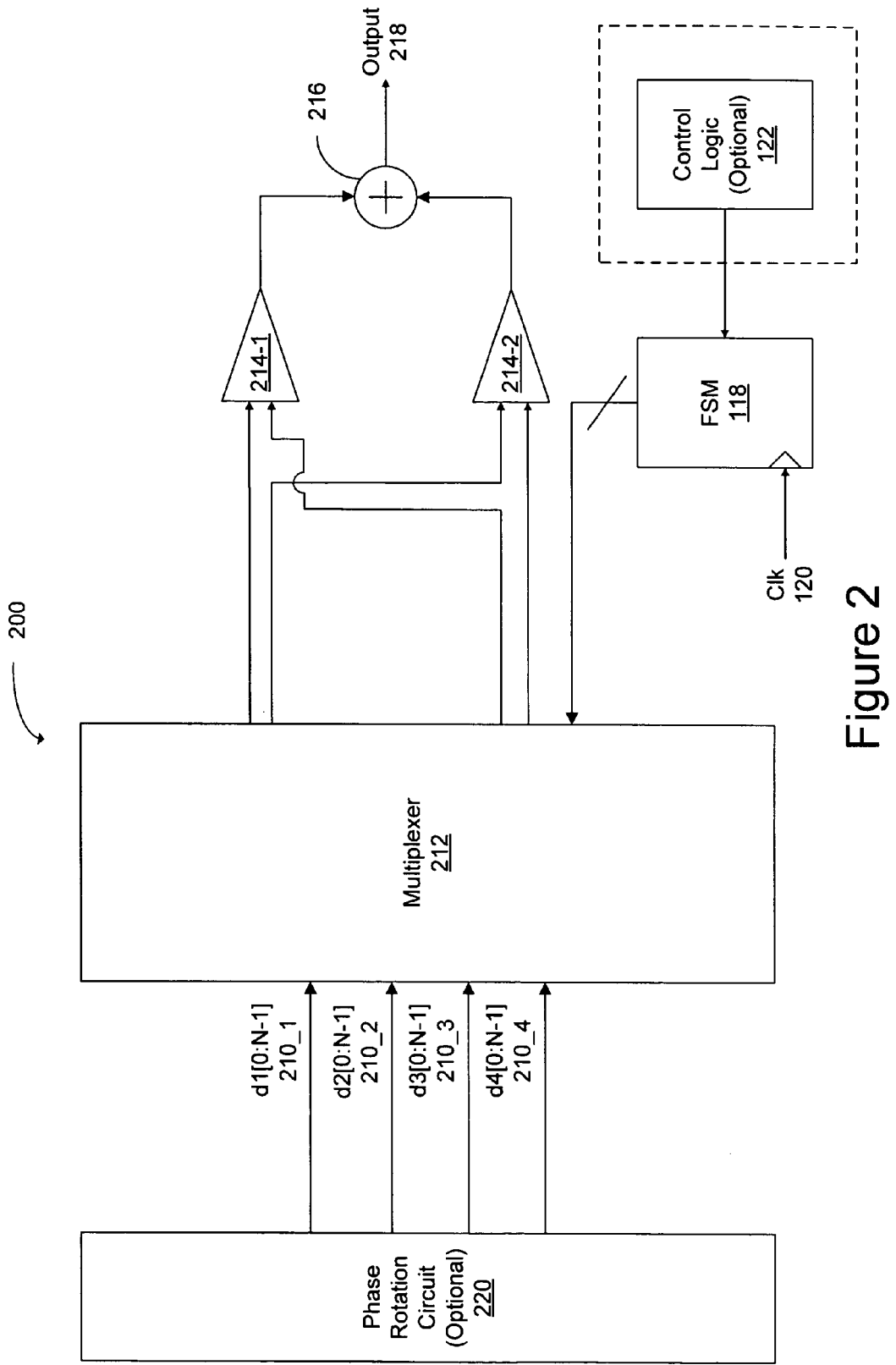
FIG. 2 is a block diagram illustrating an embodiment of a digital transmitter.

In some embodiments, the transmitter 100 may have fewer or more components. Functions of two or more components may be implemented in a single component. Alternatively, functions of some components may be implemented in additional instances of the components. For example, in some embodiments there may be more than one multiplexer 116, more than one FSM 118, more than one control logic 122, more than one memory 128 and/or more than one interface 130. While the memory 128 in transmitter 100 is implemented in the control logic 122, in some embodiments the memory 128 may be separate from the control logic 122. The transmitter 100 may also include a summation circuit 216 (FIG. 2).

Digital data symbols in one or more of the data streams 110 may be complex, i.e., having an in-phase (I) component and an out-of-phase (Q) component. The Q component may be 90° out of phase with respect to the I component. The digital data symbols in one or more the data streams 110 may also be multi-level symbols based on a bit-to-symbol modulation code. Suitable symbol coding may include two or more level pulse amplitude modulation (PAM), such as two-level pulse amplitude modulation (2PAM), four-level pulse amplitude modulation (4PAM), eight-level pulse amplitude modulation (8PAM) and sixteen-level pulse amplitude modulation (16PAM). In embodiments where at least one of the data streams 110 corresponds to passband sub-channel, i.e., a band of frequencies not including DC, multi-level PAM, also referred to as multi-level on-off keying (OOK) or multi-level amplitude shift keying, may be used. For example, two or more level on-off keying (2OOK). Suitable coding corresponding to one or more passband sub-channels may also include two or more level quadrature amplitude modulation (QAM).

In embodiments where the digital data symbols in one or more of the data streams 110 are complex, separate drivers 214 may be used to generate a real and a complex analog signal. This is illustrated in FIG. 2. Transmitter 200 has a multiplexer 212 that selectively couples at least one component of one data stream in data streams 210 to at least one of drivers 214. In the transmitter 200, the drivers 214 may implement weighting using multiplication by a real and/or imaginary component of one or more complex weights. Thus, in the general case, multiplexer 214-1 may multiply the I component and/or the Q components of at least one of the data streams 210 by a real component of a complex weight and multiplexer 214-2 may multiply the I component and/or the Q components of at least one of the data streams 210 by a complex component of the complex weight. Respective analog signals from the drivers 214 may be combined in summation circuit 216 to produce output 218.

In the transmitter 200, a sum of respective gains of driver 214-1 and driver 214-2 may substantially corresponds to a maximum output signal power from the summation circuit 216.

In order to implement some linear transformations, such as an IDFT, the transmitter 200 may optionally include a phase rotation circuit 220 for processing at least two of the data streams 210. The phase rotation circuit 220 modifies a respective phase of at least the two data streams 210.

While not shown in FIG. 2, the transmitter 200 may include one or more digital delay circuits, such as digital delay circuit 112 (FIG. 1A).

Figure 3A:
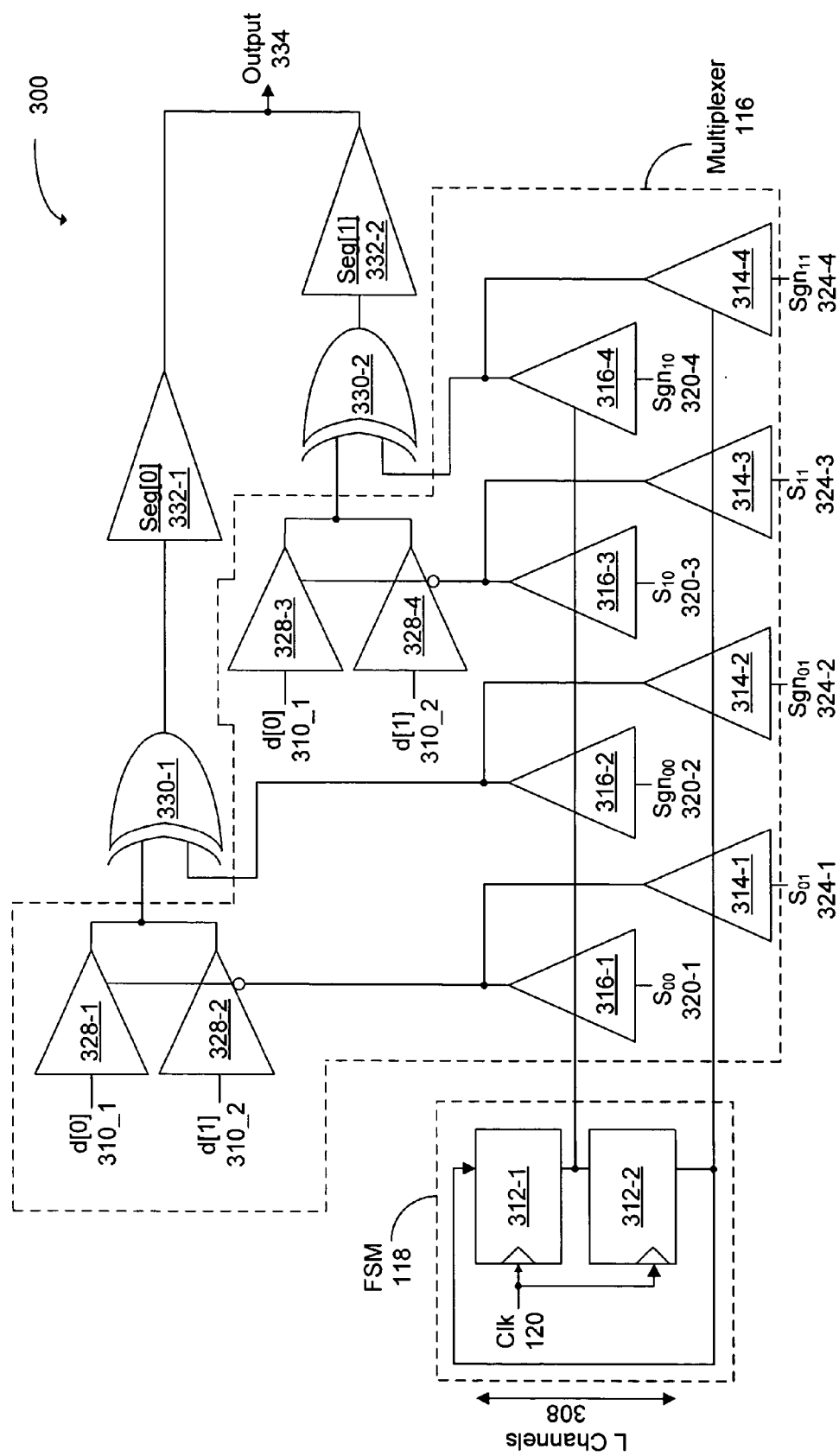
FIG. 3A is a diagram illustrating an embodiment of a digital transmitter.

FIG. 3A shows an embodiment of a transmitter 300. The multiplexer 116 includes tri-state drivers 314, 316 and 328. Tri-state drivers 314 and 316 are control drivers and tri-state drivers 328 are data selection drivers. Selective coupling of data streams 310 is implemented using code words 320 and 324, while XOR gates 330 perform a programmable inversion of the data. In this embodiment, at a given time a pairing of control drivers 314 and 316, such as tri-state driver 314-1 and tri-state driver 316-1, perform different functions on a given data selection driver 328, such as tri-state driver 328-1. Phrased differently, in this embodiment there are 2 segments operating on a given data selection driver at a given time. More generally, the multiplexer 116 may have K segments. The FSM 118 has L channels 308, each corresponding to a distinct time interval in a sequence of time intervals. In the embodiment shown, the FSM 118 is a shift register having L latches 312 for generating L distinct output signals, one of which is enabled during each of L time intervals. In the embodiment of the transmitter 300 L is 2. The multiplexer 116 selectively couples at least one of the data streams 310 to at least one of drivers or segments 332 during each time interval. Respective analog signals from the segments 332 are combined into output 334.

The transmitter 300 may implements a 2-point IDFT linear transformation using segments 332 having equal weights or gains. The FSM 118 functions as a cyclic rotator or a shift register. To implement the IDFT linear transformation, the code words 320 and 324, which may be provided by the FSM 118 or the control logic 122 (FIG. 1A), may be fixed. In the transmitter 300, the time intervals correspond to an inverse of the clock Clk 120. The FSM 118 and the multiplexer 116 control which data streams 310 are transformed during each time interval. This is illustrated in FIGS. 3B and 3C.

Figure 3B:
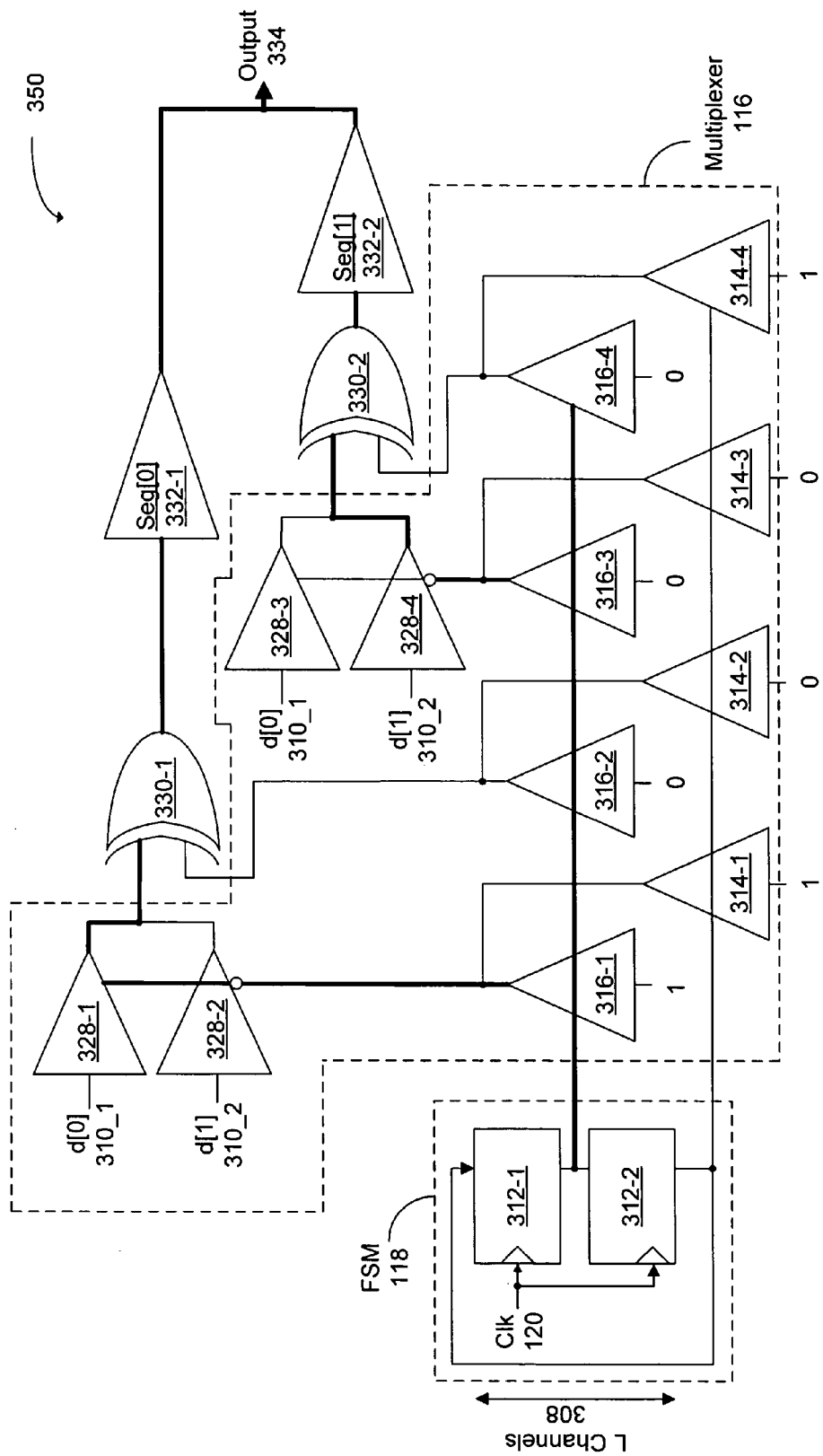
FIG. 3B is a diagram illustrating an embodiment of a digital transmitter during a first time interval.

FIG. 3B illustrates an embodiment of transmitter 350 during a first time interval. Enabled paths are shown in bold. The code word 320 is [1-0-0-0]. The code word 324 is [1-0-0-1]. The output 334 is a summation of respective analog signals corresponding to the current digital data symbols in the data streams 310, i.e., d[0]+d[1].

Figure 3C:
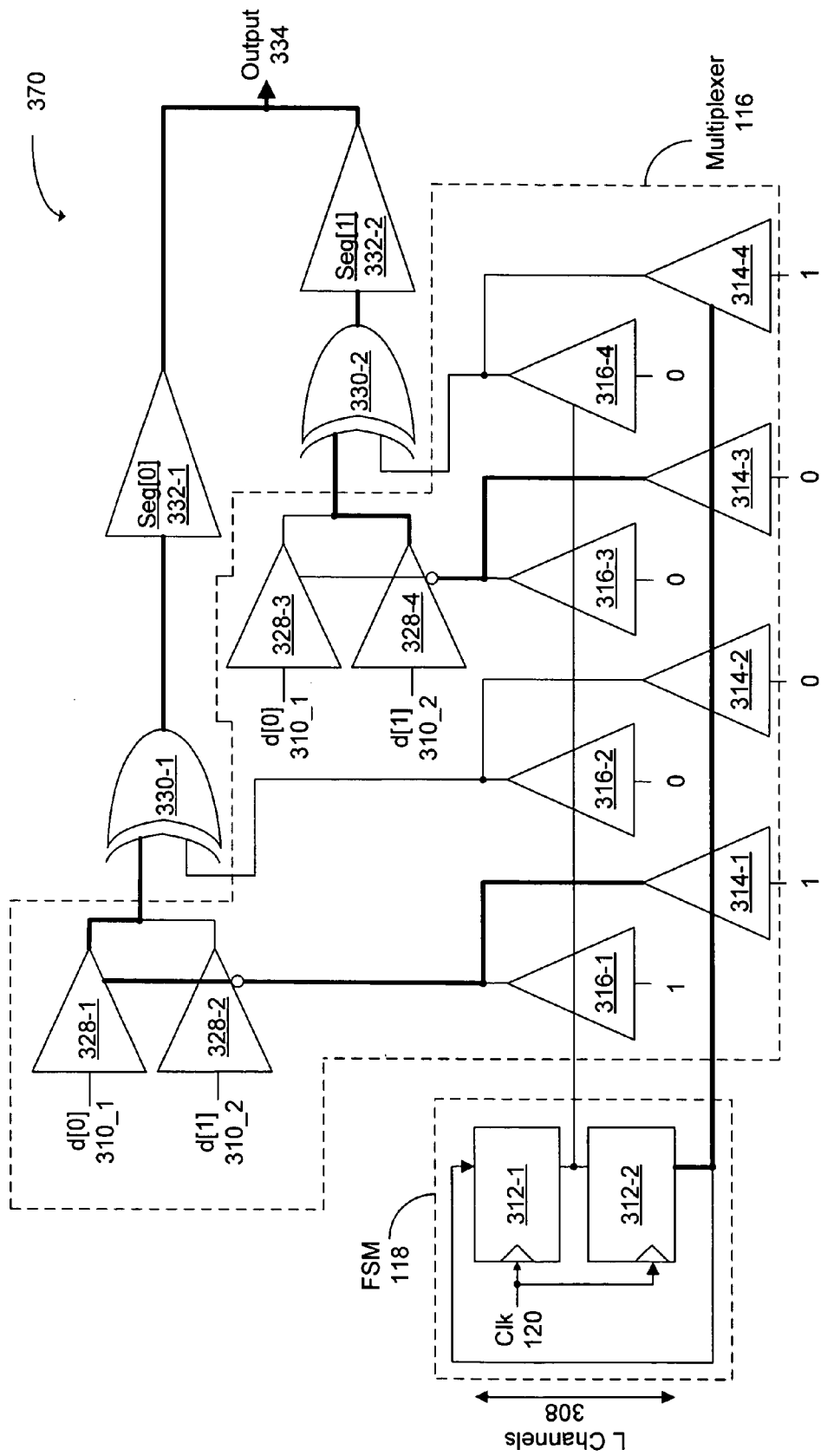
FIG. 3C is a diagram illustrating an embodiment of a digital transmitter during a second time interval.

FIG. 3C illustrates an embodiment of transmitter 370 during a second time interval. Enabled paths are shown in bold. In this example, the codes words 320 and 324 are the same as in FIG. 3B. The selected analog signals, however, have changed. Thus, the output 334 is a difference of respective analog signals corresponding to the current digital data symbols in the data streams 310, i.e., d[0]−d[1].

Figure 4:
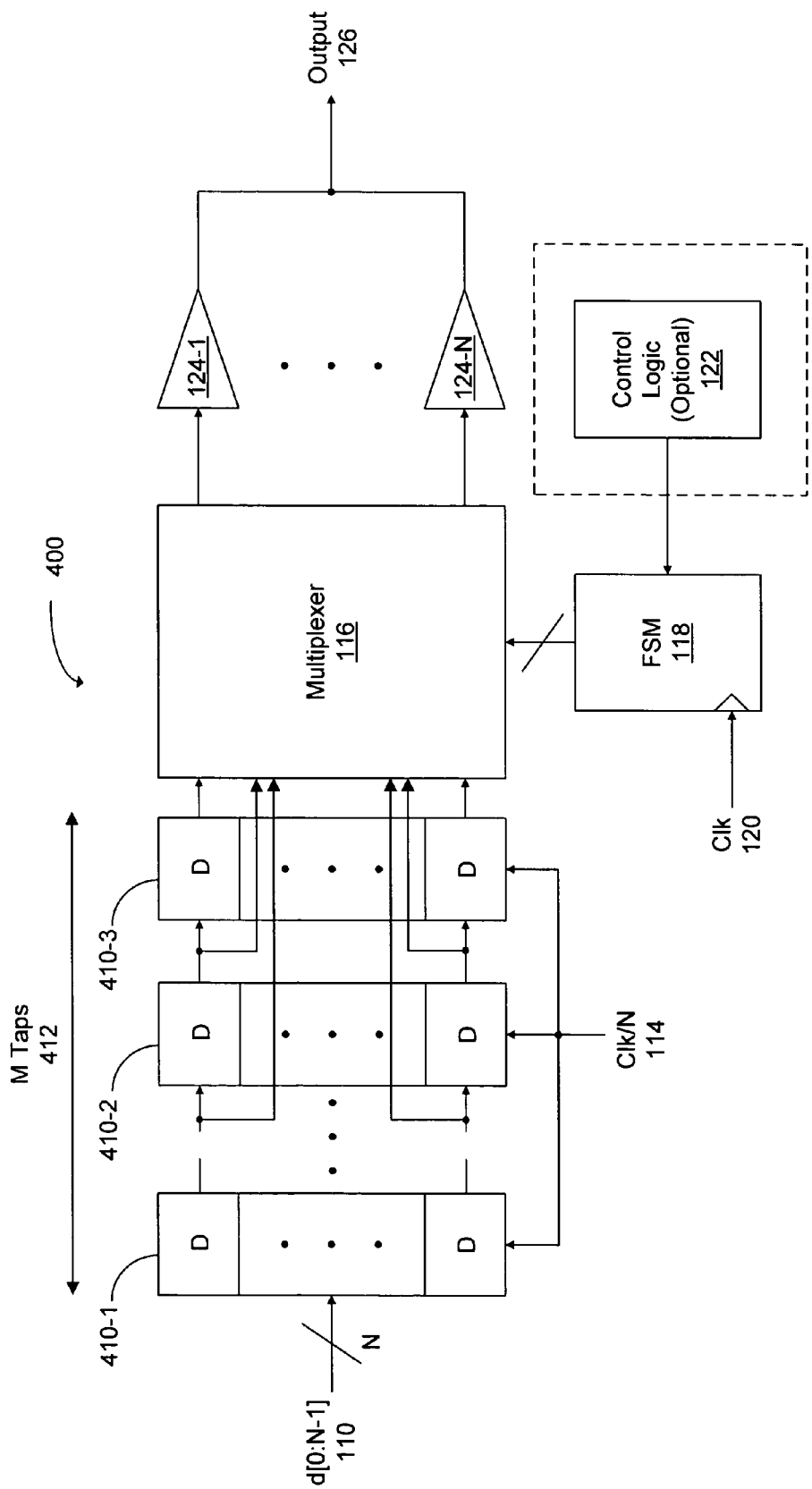
FIG. 4 is a block diagram illustrating an embodiment of a digital transmitter.

Referring back to FIG. 3A, the transmitter 300 allows implementation of the linear transformation with increased flexibility, including reusing of hardware, as well as reduced parasitic capacitance on the output 334. In general, a number of P levels in the data streams 310 corresponds to a number of signaling levels in the modulation code used to generate the digital data symbols in one or more of the data streams 310. A number of K segments corresponds to a number of segments 332, i.e., a resolution. A number of L channels 308 corresponds to a number of data streams 310. In some embodiments of the transmitter 300, there may also be a digital delay circuit, such as the digital delay circuit 112 (FIG. 1A), including a number of M taps 412 (FIG. 4).

Figure 5:
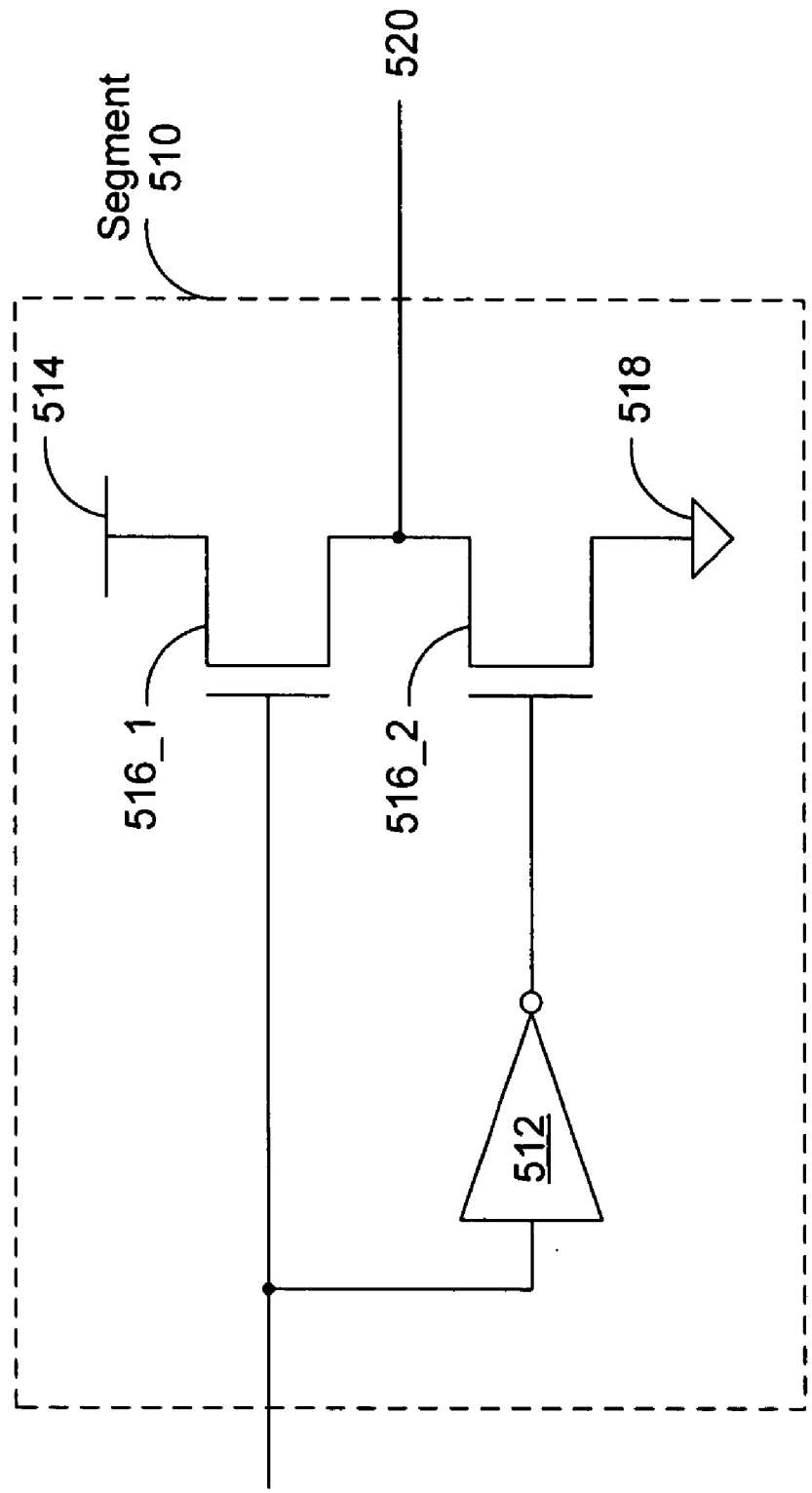
FIG. 5 is a block diagram illustrating an embodiment of a driver or segment.
Figure 6:
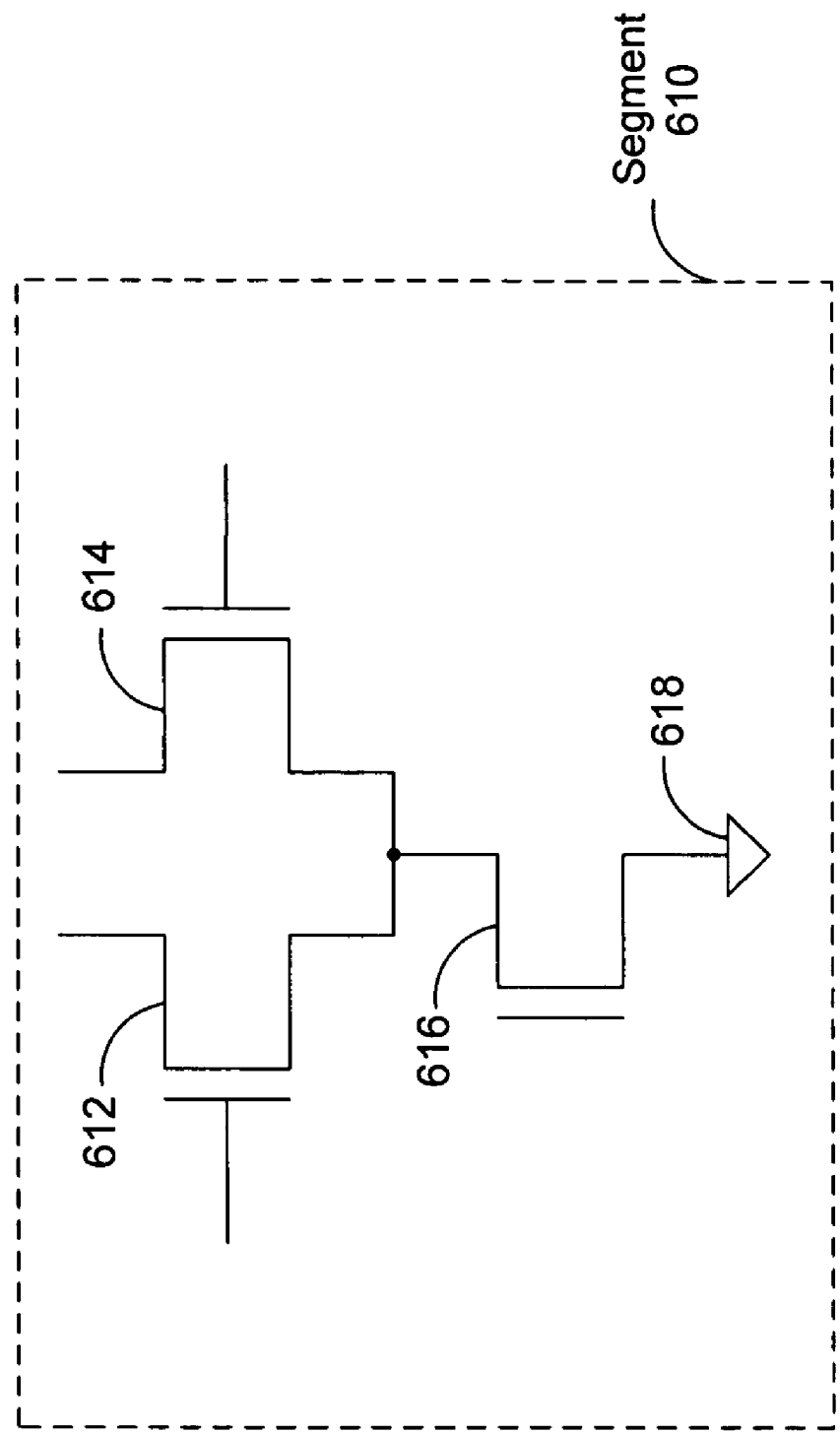
FIG. 6 is a block diagram illustrating an embodiment of a driver or segment.

A number of data selection tri-state drivers, such as tri-state drivers 328, in the transmitter 300 is given by $M \cdot (P-1) \cdot K \cdot L.$ Similarly, a total number of control tri-state drivers, such as tri-state drivers 314 and 316, is given by $K \cdot L \cdot (1 + \log_2(L \cdot M)).$ The drivers 124 (FIG. 1A) may be implemented using voltage-mode drivers or current-mode drivers, each having one or more weighted differential pairs. FIG. 5 illustrates a voltage-mode driver or segment 510. The segment 510 includes an inverter 512 and two transistors 516 for selectively pushing or pulling an output 520 to a supply rail 514 or ground 518. FIG. 6 illustrates a current-mode driver or segment 610, including transistors 612 and 614 arranged as a differential pair with a current source 616 tail coupled to ground 618.

Figure 7:
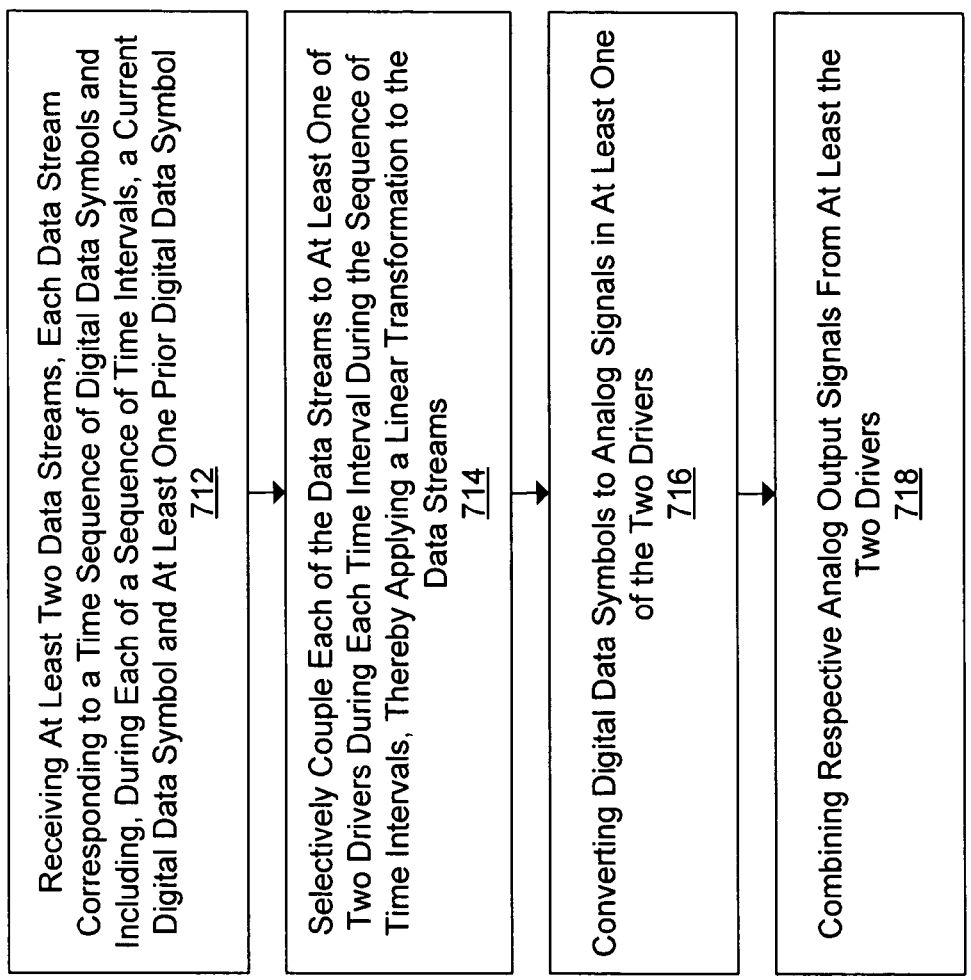
FIG. 7 is a flow diagram illustrating a method of operation of a digital transmitter.

FIG. 7 illustrates an embodiment of a method or process for using a transmitter. At least two data streams are received (712). Each data stream corresponds to a time sequence of digital data symbols and includes, during each of a sequence of time intervals, a current digital data symbol and at least one prior digital data symbol. Each of the data streams is selectively coupled to at least one of two drivers during each time interval during the sequence of time intervals, thereby applying a linear transformation to the data streams (714). The digital data symbols are converted to analog signals in at least one of the two drivers (716). Respective analog output signals from at least the two drivers are combined (718). In some embodiments, there may be fewer or additional operations, an order of the operations may be rearranged and/or two or more operations may be combined.

The transmitter may be applied in a variety of communications systems, such as a multi-tone system or link where sub-channels corresponding to bands of frequencies are used to convey information. In some embodiments of a multi-tine system using the transmitter, at least two of the data streams 110 (FIG. 1A) correspond to respective sub-channels in the multi-tone system. In some embodiments of communications systems using the transmitter, there may be a communications channel coupled to the transmitter. The communications channel may correspond to an interconnect or an interface, a bus and/or a back plane. The communications channel may correspond to inter-chip communication, such as between one or more semiconductor chips or dies, or to communication within a semiconductor chip, also known as intra-chip communication, such as between modules in an integrated circuit.

The transmitter and its methods of operation are well-suited for use in improving communication in memory systems and devices. They are also well-suited for use in improving communication between a memory controller chip and one or more memory devices or modules, such as a dynamic random access memory (DRAM) chip. The DRAM chip may be either on the same printed circuit board as the controller or embedded in a memory module. The apparatus and methods described herein may also be applied to other memory technologies, such as static random access memory (SRAM) and electrically erasable programmable read-only memory (EEPROM).

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, 3½ inch floppy media, CDs, DVDs and so on.

Figure 8:
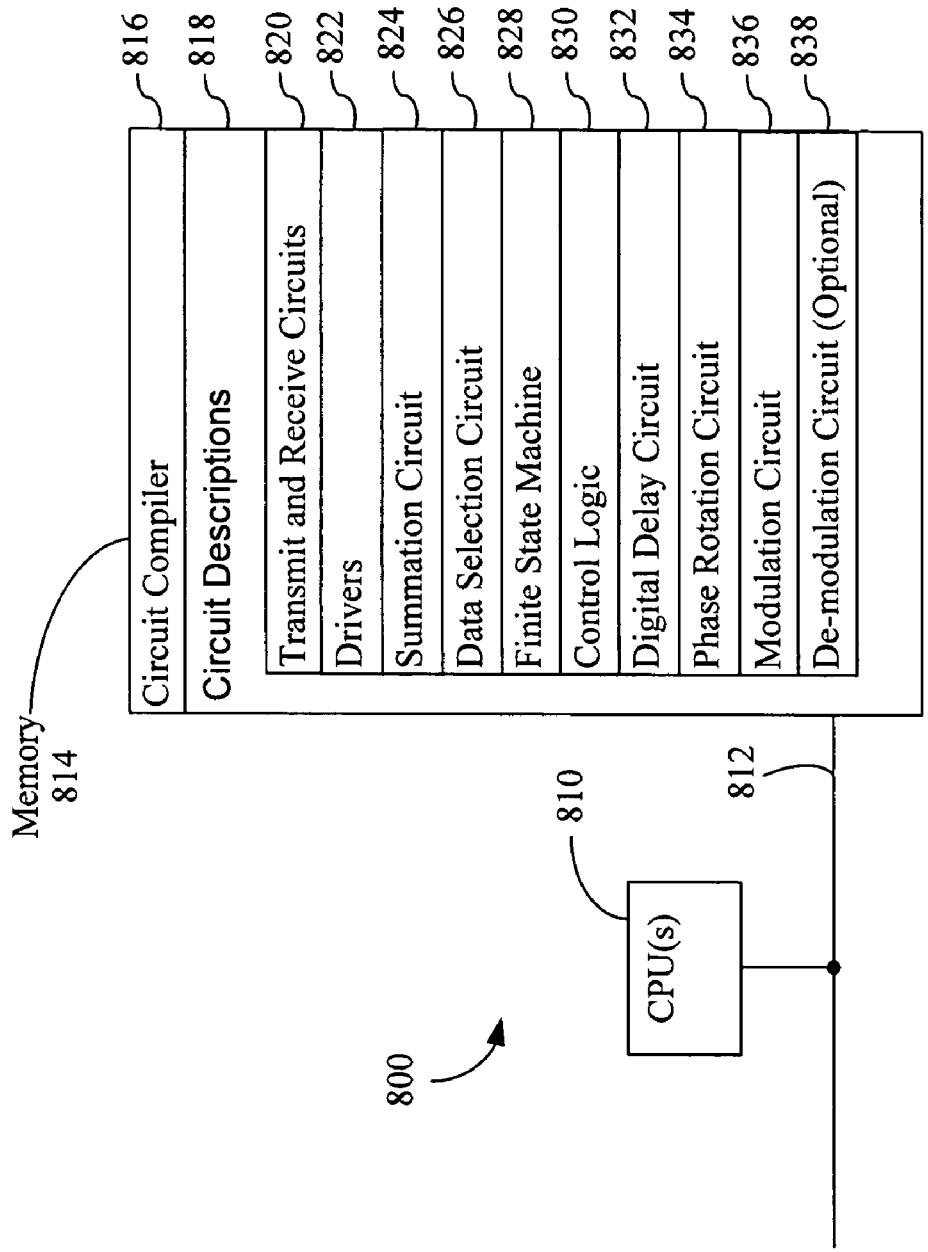
FIG. 8 is a block diagram illustrating an embodiment of a system.

FIG. 8 is a block diagram an embodiment of a system 800 for storing computer readable files containing software descriptions of the circuits. The system 800 may include at least one data processor or central processing unit (CPU) 810, a memory 814 and one or more signal lines 812 for coupling these components to one another. The one or more signal lines 812 may constitute one or more communications busses.

The memory 814 may include high-speed random access memory and/or non-volatile memory, such as one or more magnetic disk storage devices. The memory 814 may store a circuit compiler 816 and circuit descriptions 818. The circuit descriptions 818 may include transmit and receive circuits 820, segments or drivers 822, a summation circuit 824, a multiplexer or data selection circuit 826, a finite state machine 828, control logic 830, digital delay circuit 832, phase rotation circuit 834, modulation circuit 836 and optional de-modulation circuit 838. The de-modulation circuit 838 may be used in a receiver that includes the circuitry that have been described in the transmitter.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A transmitter, comprising:
a set of weighted drivers, each having a respective weight, the set of weighted drivers including a first driver and a second driver, each of the weighted drivers having an output for a respective analog output signal;
a circuit for combining respective analog output signals from the weighted drivers;
a data selection circuit to process at least two data streams, each data stream corresponding to a time sequence of digital data symbols, wherein the data selection circuit receives the at least two data streams and selectively couples at least one of the data streams to at least one of the first driver and the second driver during each time interval of a sequence of N time intervals; and
a finite state machine to control the data selection circuit during each time interval of the sequence of N time intervals in accordance with a sequence of N code words, where N is an integer greater than one;
wherein, during the sequence of N time intervals, the selective coupling by the data selection circuit in response to the N code words and the combining of the analog output signals of the set of weighted drivers subjects the data streams to a linear transformation.

2. The transmitter of claim 1, wherein at least one data stream of the at least two data streams includes, during each of the sequence of N time intervals, a current digital data symbol and at least one prior digital data symbol, and wherein the linear transformation includes combining the current digital data symbol and at least the one prior digital data symbol of at least the one data stream.

3. The transmitter of claim 2, wherein combining the current digital data symbol and at least the one prior digital data symbol of at least the one data stream accomplishes equalization.

4. The transmitter of claim 1, wherein the selective coupling by the data selection circuit is varied during the sequence of N time intervals in accordance with the sequence of N code words.

5. The transmitter of claim 1, further comprising a memory, wherein the memory stores the sequence of N code words.

6. The transmitter of claim 1, further comprising a control logic, wherein the control logic provides the sequence of N code words to the finite state machine and the sequence of N code words is programmable.

7. The transmitter of claim 1, further comprising an interface coupled to the finite state machine, wherein the interface is configured to receive the sequence of N code words.

8. The transmitter of claim 1, wherein a sum of respective gains of the first driver and the second driver substantially corresponds to a maximum output signal power.

9. The transmitter of claim 1, wherein at least the two data streams are selectively coupled to the first driver and the second driver during each time interval.

10. The transmitter of claim 1, further comprising a digital delay circuit for delaying at least the two data streams, wherein the digital delay circuit includes at least a first digital delay, and wherein at least the one prior digital data symbol is provided by an output from the digital delay circuit.

11. The transmitter of claim 1, further comprising a phase rotation circuit for processing at least the two data streams, wherein the phase rotation circuit modifies a respective phase of at least the two data streams and the linear transformation includes an inverse discrete Fourier transform.

12. The transmitter of claim 1, wherein at least the two data streams correspond to respective sub-channels in a multi-tone system.

13. The transmitter of claim 1, wherein the sequence of N code words is selected in accordance with at least a characteristic of a communications channel coupled to the transmitter.

14. The transmitter of claim 1, wherein the sequence of N code words is selected in accordance with at least a characteristic of a communications channel and at least one receiver device coupled to the transmitter.

15. A computer readable medium containing data representing a circuit that includes:
a transmitter, comprising:
    a set of weighted drivers, each having a respective weight, the set of weighted drivers including a first driver and a second driver, each of the weighted drivers having an output for a respective analog output signal;
    a circuit for combining respective analog output signals from the weighted drivers;
    a data selection circuit to process at least two data streams, each data stream corresponding to a time sequence of digital data symbols, wherein the data selection circuit receiving the at least two data streams and selectively coupling at least one of the data streams to at least one of the first driver and the second driver during each time interval of a sequence of N time intervals; and
a finite state machine to control the data selection circuit during each time interval of the sequence of N time intervals in accordance with a sequence of N code words, where N is an integer greater than one;
wherein, during the sequence of N time intervals, the selective coupling by the data selection circuit in response to the N code words and the combining of the analog output signals of the set of weighted drivers subjects the data streams to a linear transformation.

16. A transmitter mechanism, comprising:
a set of weighted driver means, each having a respective weight, the set of weighted driver means including a first driver means and a second driver means, each of the weighted driver means having an output for a respective analog output signal;
means for combining respective analog output signals from the weighted driver means;
a data selection means for processing at least two data streams, each data stream corresponding to a time sequence of digital data symbols, wherein the data selection means receiving the at least two data streams and selectively coupling at least one of the data streams to at least one of the first driver means and the second driver means during each time interval of a sequence of N time intervals; and
a finite state machine means to control the data selection means during each time interval of the sequence of N time intervals in accordance with a sequence of N code words, where N is an integer greater than one;
wherein, during the sequence of N time intervals, the selective coupling by the data selection circuit in response to the N code words and the combining of the analog output signals of the set of weighted drivers subjects the data streams to a linear transformation.

17. A method of transmitting data, comprising:
receiving at least two data streams, each data stream corresponding to a time sequence of digital data symbols;
selectively coupling at least one of the data streams to at least one of a first driver and a second driver during each time interval of a sequence of N time intervals and the selectively coupling is in accordance with a sequence of N code words and an output from a finite state machine, where N is an integer greater than one;
converting digital data symbols to analog data signals in the first driver and the second driver, wherein each driver, including the first driver and the second driver, has a respective weight; and
combining respective analog output data signals from the first driver and the second driver, wherein, during the sequence of N time intervals, the selective coupling in accordance with the sequence of N code words and the combining of the respective analog output data signals subjects the data streams to a linear transformation.

18. The method of claim 17, wherein the selective coupling by the data selection circuit is varied during the sequence of N time intervals in accordance with the sequence of N code words.

19. The method of claim 17, further comprising programming the sequence of N code words.

20. The method of claim 17, further comprising receiving the sequence of N code words using an external interface.

21. The method of claim 17, wherein a sum of respective gains of the first driver and the second driver substantially corresponds to a maximum output signal power.

22. The method of claim 17, wherein at least the two data streams are selectively coupled to the first driver and the second driver during each time interval.

23. The method of claim 17, farther comprising phase rotating a respective phase of at least the two data streams, wherein the linear transformation includes an inverse discrete Fourier transform.

24. The method of claim 17, further comprising selecting the sequence of N code words in accordance with at least a characteristic of a communications channel.

25. The method of claim 17, further comprising selecting the sequence of N codes word in accordance with at least a characteristic of a communications channel and at least one receiver device.

26. The method of claim 17, wherein at least one data stream of the at least two data streams includes, during each of the sequence of N time intervals, a current digital data symbol and at least one prior digital data symbol, and
    wherein the linear transformation includes combining the current digital data symbol and at least the one prior digital data symbol of at least the one data stream.

* * * * *